UNITED STATES PATENT OFFICE 2,357,268

PREPARATION OF SULPHONYL ARYL BIGUANIDES

Richard O. Roblin, Jr., Old Greenwich, and George W. Anderson, Stamford, Conn., assignors to American Cyanamid Company, New York, N. Y., a corporation of Maine No Drawing. Application April 11, 1942, Serial No. 438,570

7 Claims. (Cl. 260—397.7)

This invention relates to a method for preparing aryl derivatives of aryl sulphonyl biguanides. More particularly it relates to a method of preparing biguanide derivatives by reacting an aryl sulphonyl dicyandiamide with an arylamine.

The reaction may be illustrated by the following equation:

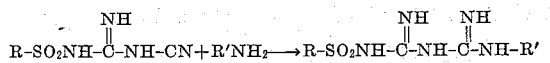

wherein R and R' represent aryl radicals. The reaction in our process takes place between the amino group of the arylamine and the —CN group of the arylsulphonyl dicyandiamide and the character of the aryl radicals does not interfere with the reaction. The aryl radical may therefore be either of the benzene or naphthalene series and may or may not have other substituents on the ring.

The process of the present invention is especially suited for the preparation of compounds represented by the following general formula:

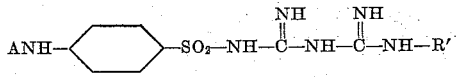

where A represents hydrogen or an acyl radical of a carboxylic acid and R' is an aryl radical.

The compounds of the above formula are not claimed in the present application since they are claimed in the co-pending application of Philip S. Winnek, Serial No. 380,336, filed February 24, 1941.

In accordance with the present invention we have discovered that arylamines will react with an aryl sulphonyl dicyandiamide to give an aryl biguanide derivative. Preferably an arylamine such as aniline is made to react with a p-acylaminobenzenesulphonyl dicyandiamide by refluxing in a suitable solvent, such as for example, dioxane. The compound produced by such reaction is a p-acylaminobenzenesulphonyl aryl biguanide which can be very readily hydrolyzed to give a sulphanilyl aryl biguanide.

The invention will be described in greater detail in conjunction with the following specific examples which illustrate the preferred methods of carrying out our process. The invention, however, is not to be limited by the exact details set forth therein. The parts are by weight except in the case of liquids which are expressed in corresponding parts by volume.

EXAMPLE 1

*Sulphanilyl-o-tolylbiguanide*

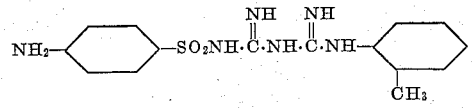

Four parts of acetylsulphanilyl dicyandiamide and 3 parts of o-toluidine are refluxed in 30 parts of dry dioxane for six hours. The solution is diluted with water, made slightly alkaline with ammonia and the solid product filtered off.

The acetylsulphanilyl o-tolylbiguanide is hydrolyzed without further purification by refluxing 4 parts with 6 parts of concentrated hydrochloric acid plus 12 parts of water for five minutes after a solution is obtained. The hot solution is filtered, cooled and neutralized with a sodium hydroxide solution. Recrystallization of the precipitate from dilute alcohol using decolorizing carbon yields pure sulphanilyl o-tolylbiguanide.

EXAMPLE 2

*Sulphanilylphenyl biguanide*

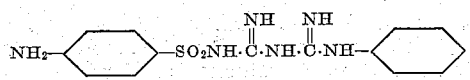

Five parts of acetylsulphanilyl dicyandiamide and 3.3 parts of aniline are refluxed in 30 parts of dry dioxane for six hours. The product is precipitated by dilution with dilute ammonium hydroxide. Refluxing of this product with 10 parts of concentrated hydrochloric acid plus 20 parts of water for five minutes after solution is obtained, filtering, cooling and neutralizing with sodium hydroxide solution yields the crude sulphanilylphenyl biguanide. It may be purified by recrystallization from dilute alcohol, using decolorizing carbon.

EXAMPLE 3

*Sulphanilyl p-anisidylbiguanide*

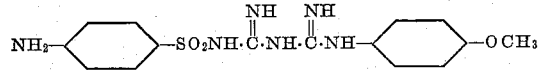

Five parts of acetylsulphanilyl dicyandiamide and 4.4 parts of p-anisidine are refluxed in 30 parts of dry dioxane for six hours. The product precipitated by dilute ammonium hydroxide is hydrolyzed by refluxing with 10 parts of concentrated hydrochloric acid plus 20 parts of water for five minutes after all is in solution. Decolorizing carbon is added for the last two minutes. The hot solution is filtered, cooled and made slightly alkaline with sodium hydroxide solution. After chilling, the crude sulphanilyl p-anisidylbiguanide is filtered off and purified by recrystallization from dilute alcohol.

In the foregoing examples dioxane was employed as the reaction medium. The reaction may be carried out in various other organic liquid media, such as for example, acetone, isopropyl alcohol, tertiary butyl alcohol, or the like.

The acetyl sulphanilyl dicyandiamide employed as an intermediate may be very conveniently prepared by reacting p-acetylaminobenzenesulphonyl chloride with dicyandiamide in the presence of potassium hydroxide. When desired, the acetylsulphanilyl dicyandiamide may be replaced by the corresponding acyl derivative of any carboxylic acid. Suitable carboxylic acids include those such as propionic, butyric, benzoic, nicotinic, and the like. The acetyl compounds, however, is preferred because of its cheapness and availability.

Among the aromatic sulphonyl dicyandiamides that can be used in our process may be included those such as benzenesulphonyl dicyandiamide, p-toluenesulphonyl dicyandiamide, p-carboxybenzenesulphonyl dicyandiamide, m-nitrobenzenesulphonyl dicyandiamide, o-brombenzenesulphonyl dicyandiamide, p-methoxybenzenesulphonyl dicyandiamide, α-naphthalenesulphonyl dicyandiamide, β-naphthalenesulphonyl dicyandiamide, α-5-sulphonaphthalenesulphonyl dicyandiamide, etc.

The process, as specifically illustrated, employed the most readily available arylamines. The invention, however, is not limited to reactions employing these specific arylamines and any arylamine of the benzene or naphthalene series may be employed in the process; for example, unsubstituted arylamines may be employed or arylamines having one or a plurality of substituents on the ring including substituents of the type alkyl, alkoxy, and the like. Suitable arylamines include the phenylamines, aminotoluenes, aminoxylenes, alkylanilines, the aryl diamines, such as o-phenylenediamine, m-phenylenediamine, p-phenylenediamine, mono-aminonaphthalenes and diaminonaphthalenes.

It is obvious that the above description and examples are intended to be illustrative only and that they may be varied or modified to a considerable extent without departing from the spirit of the invention or sacrificing the advantages thereof. We do not, therefore, intend to limit ourselves to the specific embodiments herein set forth except as indicated in the appended claims.

What we claim is:

1. The process of producing aryl derivatives of sulphonyl biguanides which comprises reacting an aryl sulphonyl dicyandiamide with an arylamine, said reaction being carried out by heating the reactants in a solvent.

2. The process which comprises reacting an arylamine with an aryl sulphonyl dicyandiamide, said reaction being carried out by heating the reactants in a solvent.

3. The process of producing sulphanilyl aryl biguanides which comprises reacting an acyl sulphanilyl dicyandiamide with an arylamine, said reaction being carried out by heating the reactants in a solvent.

4. The process of producing sulphanilyl aryl biguanides which comprises reacting, by heating in a solvent, an acyl sulphanilyl dicyandiamide with an arylamine, to give an acyl sulphanilyl aryl biguanide and removing the acyl group by hydrolysis to give a sulphanilyl aryl biguanide.

5. The process of producing sulphanilyl-o-tolylbiguanide which comprises reacting, by heating in a solvent, acetylsulphanilyl dicyandiamide with o-toluidine to give acetylsulphanilyl-o-tolylbiguanide, and removing the acetyl group by hydrolysis.

6. The process of producing sulphanilyl-phenylbiguanide which comprises reacting, by heating in a solvent, acetylsulphanilyl dicyandiamide with aniline to give acetylsulphanilyl-phenylbiguanide, and removing the acetyl group by hydrolysis.

7. The process of producing sulphanilyl-p-anisidyl biguanide which comprises reacting, by heating in a solvent, acetylsulphanilyl dicyandiamide with p-anisidine to give acetylsulphanilyl-p-anisidyl biguanide, and removing the acetyl group by hydrolysis.

RICHARD O. ROBLIN, Jr.
GEORGE W. ANDERSON.